United States Patent
Reichard et al.

(10) Patent No.: US 8,958,218 B2
(45) Date of Patent: Feb. 17, 2015

(54) SYSTEM AND METHOD FOR POWER CONVERSION FOR RENEWABLE ENERGY SOURCES

(71) Applicant: ZBB Energy Corporation, Menomonee Falls, WI (US)

(72) Inventors: Jeffrey A. Reichard, Oconomowoc, WI (US); Nathan Jobe, Germantown, WI (US)

(73) Assignee: ZBB Energy Corporation, Menomonee Falls, WI (US)

( * ) Notice: Subject to any disclaimer, the term of this patent is extended or adjusted under 35 U.S.C. 154(b) by 278 days.

(21) Appl. No.: 13/668,490

(22) Filed: Nov. 5, 2012

(65) Prior Publication Data
US 2013/0114312 A1    May 9, 2013

Related U.S. Application Data

(60) Provisional application No. 61/555,727, filed on Nov. 4, 2011.

(51) Int. Cl.
| | |
|---|---|
| *H02M 5/458* | (2006.01) |
| *H02M 7/04* | (2006.01) |
| *H02M 7/44* | (2006.01) |
| *G05F 5/00* | (2006.01) |

(52) U.S. Cl.
CPC . *G05F 5/00* (2013.01); *Y02E 10/76* (2013.01); *Y02E 60/60* (2013.01)
USPC .................................. 363/37; 363/84; 363/95

(58) Field of Classification Search
USPC ................. 363/34, 37, 78, 80, 81, 84, 95, 97; 307/44, 64, 66; 290/44, 50, 55
See application file for complete search history.

(56) References Cited

U.S. PATENT DOCUMENTS

| | | | | |
|---|---|---|---|---|
| 4,924,371 | A | * | 5/1990 | Peterson .......................... 363/89 |
| 5,633,790 | A | * | 5/1997 | Gritter et al. .................... 363/55 |
| 5,929,538 | A | * | 7/1999 | O'Sullivan et al. ............. 307/66 |

(Continued)

FOREIGN PATENT DOCUMENTS

KR     1020100073985 A     1/2010

OTHER PUBLICATIONS

International Search Report and the Written Opinion of the International Searching Authority, dated Feb. 19, 2013 for Application No. PCT/2012/063500, 9 pages.

*Primary Examiner* — Adolf Berhane
*Assistant Examiner* — Nusrat Quddus
(74) *Attorney, Agent, or Firm* — Boyle Fredrickson, S.C.

(57) ABSTRACT

An energy conversion system for use with an alternative energy source is disclosed. The alternative energy source can generate either an AC or a DC voltage. A first power converter is connected between the source and a DC bus, and a second power converter is connected between the DC bus and the grid or another load. The first power converter is configured to operate during periods of low energy generation. The energy captured will be stored in an electrical storage medium. When sufficient energy is stored, this energy is subsequently transferred to the grid or load via the second power converter. The second power converter is configured to operate intermittently during periods of low power generation, transferring energy from the DC bus when sufficient energy is stored and turning off when the stored energy drops to a point at which the second power converter can no longer be operated efficiently.

12 Claims, 5 Drawing Sheets

(56) References Cited

U.S. PATENT DOCUMENTS

| | | | |
|---|---|---|---|
| 6,222,335 B1* | 4/2001 | Hiti et al. | 318/432 |
| 6,449,179 B1* | 9/2002 | Reichard | 363/131 |
| 7,148,664 B2* | 12/2006 | Takahashi et al. | 323/222 |
| 7,990,097 B2* | 8/2011 | Cheng et al. | 318/800 |
| 8,624,561 B1* | 1/2014 | Slavin | 320/166 |
| 2007/0064363 A1* | 3/2007 | Nielsen et al. | 361/90 |
| 2010/0206378 A1 | 8/2010 | Erickson, Jr. et al. | |
| 2010/0265747 A1 | 10/2010 | Egiziano et al. | |
| 2011/0050141 A1* | 3/2011 | Yeh et al. | 318/434 |
| 2011/0130889 A1 | 6/2011 | Khajehoddin et al. | |
| 2011/0264288 A1 | 10/2011 | Kahjehoddin et al. | |
| 2012/0326672 A1* | 12/2012 | Dennis et al. | 320/134 |

* cited by examiner

SYSTEM AND METHOD FOR POWER CONVERSION FOR RENEWABLE ENERGY SOURCES

CROSS-REFERENCE TO RELATED APPLICATIONS

This application claims priority to U.S. provisional application Ser. No. 61/555,727, filed Nov. 4, 2011, the entire contents of which is incorporated herein by reference.

BACKGROUND OF THE INVENTION

The subject matter disclosed herein relates to power converters and, more specifically, to improved power conversion for renewable energy systems during periods of low power production.

In recent years, increased demands for energy and increased concerns about supplies of fossil fuels and their corresponding pollution have led to an increased interest in renewable energy sources. Two of the most common and best developed renewable energy sources are photovoltaic energy and wind energy. Other renewable energy sources may include fuel cells, hydroelectric energy, tidal energy, and bio-fuel or biomass generators. However, using renewable energy sources to generate electrical energy presents a new set of challenges.

Many renewable energy sources provide a variable supply of energy. The supply may vary, for example, according to the amount of wind, cloud cover, or time of day. Further, different energy sources provide different types of electrical energy. A wind turbine, for example, is better suited to provide Alternating Current (AC) energy while a photovoltaic cell is better suited to provide Direct Current (DC) energy. Due to the variable nature of the energy supplied as well as the varying type of energy generated, power converters are commonly inserted between the renewable energy source and the utility gird or an electrical load, if operating independently of the utility grid.

It is known that power converters have inherent losses which prevent all of the power generated by the renewable energy source from being converted to usable electrical energy. At low levels of power generation, the energy losses may be greater than the power being generated by the renewable energy source. The power converter is typically switched off to avoid an operating condition in which the power generation system is actually using more energy than it is generating.

Thus, in order to maximize the efficiency of the power generation system, it is desirable to capture energy generated at and to provide a converter able to efficiently operate at low power generation levels.

BRIEF DESCRIPTION OF THE INVENTION

The subject matter disclosed herein discloses an energy conversion system for use with an alternative energy source. The source can be an AC (wind turbine) or DC (solar) source. The converter connected to the source is configured to operate during periods of low energy generation. The energy captured will be stored in an electrical storage medium such as an ultra-capacitor or battery. When sufficient energy is stored, this energy is subsequently transferred to the grid or an electrical load via a second power converter. Although the second power converter normally has an operating power loss greater than the power generated from the renewable source during periods of low energy generation, by storing the energy and using it in an intermittent mode the second converter can be run at an efficient operating point.

According to one embodiment of the invention, a power conversion system includes a first power converter having an input and an output and a second power converter having an input and an output. The first power converter is configured to receive electrical energy in a first form at the input and provide a DC voltage at a predefined magnitude at the output, and the second power converter is configured to receive the DC voltage at the predefined magnitude at the input and provide an AC voltage at the output. A DC bus connects the output of the first power converter and the input of the second power converter and is configured to conduct the DC voltage at the predefined magnitude. An energy storage device is operatively connected to the DC bus. The second power converter has a first threshold below which it stops converting the DC voltage to the AC voltage and a second threshold above which it starts converting the DC voltage to the AC voltage. The first power converter is configured to convert the electrical energy at the input to the DC voltage below the first threshold of the second power converter, and the energy storage device is configured to store electrical energy when the first power converter is operating and the second power converter is not operating.

According to another aspect of the invention, a DC-to-DC converter may be operatively connected between the DC bus and the energy storage device. The energy storage device may be an ultra-capacitor or a battery. A sensor generates a feedback signal corresponding to an amplitude of voltage or state of charge present on the energy storage device. The second power converter receives the feedback signal and compares the feedback signal to the second threshold to control operation of the second power converter.

According to still another aspect of the invention, the first power converter includes a plurality of switches selectively connecting the input to the output according to a plurality of control signals. Each control signal corresponds to one of the plurality of switches, and each switch has a switching loss associated with selectively connecting the input to the output. A controller generates the control signals to convert the electrical energy at the input to the DC voltage in a first mode and in a second mode. The controller operates in the first mode above a third threshold, where the third threshold is equal to or greater than the switching losses generated by the switches in the first mode, and the controller operates in the second mode below the third threshold.

According to another embodiment of the invention, a method of controlling power transfer from a renewable energy source to an electrical load using a first power converter and a second power converter is disclosed. The first and second power converters are connected via a DC bus, and the renewable energy source has a variable power generation capability. The method includes the steps of executing a control module on the first power converter to transfer energy generated by the renewable energy source to the DC bus, storing at least a portion of the energy from the DC bus in an energy storage device, measuring the energy stored in the energy storage device, executing a control module on the second power converter to transfer energy from the DC bus to one of an electrical load and an energy grid, and measuring the rate of energy transfer from the DC bus. The step of executing the control module on the second power converter to transfer energy from the DC bus to one of an electrical load and an energy grid is disabled when the rate of energy transfer from the DC bus drops below a first threshold and is enabled when the energy stored in the energy storage device exceeds a second threshold.

According to another aspect of the invention, the step of storing at least a portion of the energy from the DC bus in an energy storage device further comprises the steps of measuring an amplitude of voltage present on the DC bus, and executing a control module on a third power converter connected between the DC bus and the energy storage device to transfer energy between the DC bus and the energy storage device as a function of the amplitude of voltage present on the DC bus. The step of executing a control module on the first power converter to transfer energy generated by the renewable energy source to the DC bus may be disabled when the rate of energy transfer from the renewable energy source to the DC bus drops below a third threshold, where the third threshold is less than the first threshold.

According to another embodiment of the invention, a power conversion system includes a first power converter having an input and an output and a second power converter having an input and an output. The first power converter is configured to receive electrical energy in a first form at the input and provide a DC voltage at a predefined magnitude at the output, and the second power converter is configured to receive the DC voltage at the predefined magnitude at the input and provide an AC voltage at the output. A DC bus connects the output of the first power converter and the input of the second power converter and is configured to conduct the DC voltage at the predefined magnitude. The power conversion system also includes a third power converter having an input and an output. The input is connected to the DC bus, and the third power converter is configured to convert the DC voltage at the input to a second DC voltage at the output and is further configured for bidirectional power transfer between the input and the output. An energy storage device is operatively connected to the output of the third power converter, and a sensor generates a signal corresponding to a magnitude of energy present in the energy storage device. The second power converter stops converting the DC voltage to the AC voltage when the rate of power transfer in the second power converter drops below a first threshold and starts converting the DC voltage to the AC voltage when the signal corresponding to a magnitude of energy present in the energy storage device is equal to or greater than a second threshold. The first power converter stops converting the electrical energy at the input to the DC voltage when the rate of power transfer in the first power converter drops below a third threshold, where the third threshold is less than the first threshold, and the energy storage device is configured to store electrical energy when the first power converter is operating and the second power converter is not operating.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
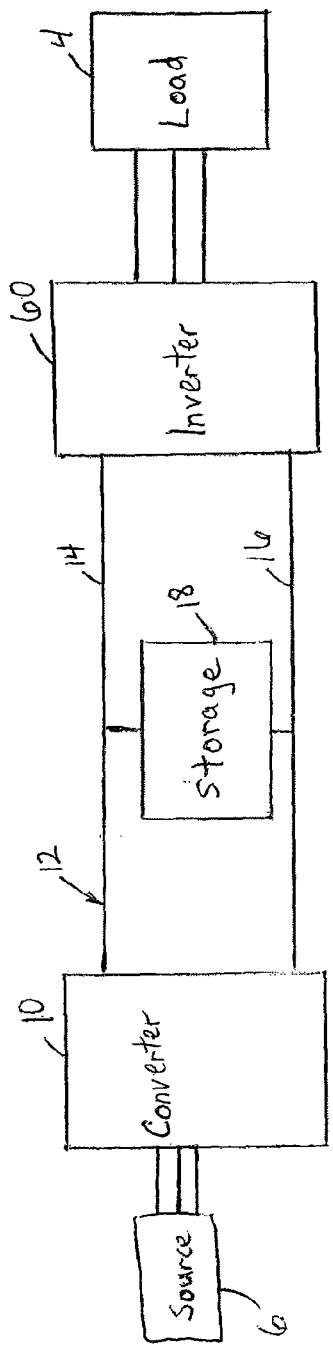
FIG. 1 is a block diagram representation of a power conversion system according to one embodiment of the invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, a power conversion system receives power from an energy source 6. According to one embodiment of the invention, the energy source 6 is an alternate energy source, such as a photovoltaic (PV) array or a wind turbine. The energy source 6 is electrically connected to a first power converter 10. The first power converter 10 is configured to convert the energy generated by the alternate energy source 6 to a DC voltage, $V_{DC}$, at a desired magnitude. This DC voltage, $V_{DC}$, is provided to a DC bus 12 having a positive rail 14 and a negative rail 16. As is understood in the art, the positive rail 14 and the negative rail 16 may conduct any suitable DC voltage potential with respect to a common or neutral voltage and are not limited to a positive or a negative DC voltage potential. Further, either of the positive rail 14 or the negative rail 16 may be connected to a neutral voltage potential. The positive rail 14 typically conducts a DC voltage having a greater potential than the negative rail 16. An energy storage device 18 is connected to the DC bus 12 and is configured to draw power from and return power to the DC bus 12. A second power converter 60 is connected between the DC bus 12 and a load 4. According to one embodiment of the invention, the second power converter 60 is an inverter configured to convert the DC voltage, $V_{DC}$, present on the DC bus 12 into a three-phase AC voltage. Optionally, the second power converter 60 may convert the convert the DC voltage, $V_{DC}$, present on the DC bus 12 into other suitable forms of electrical power according to the requirements of the load 4.

Figure 2:
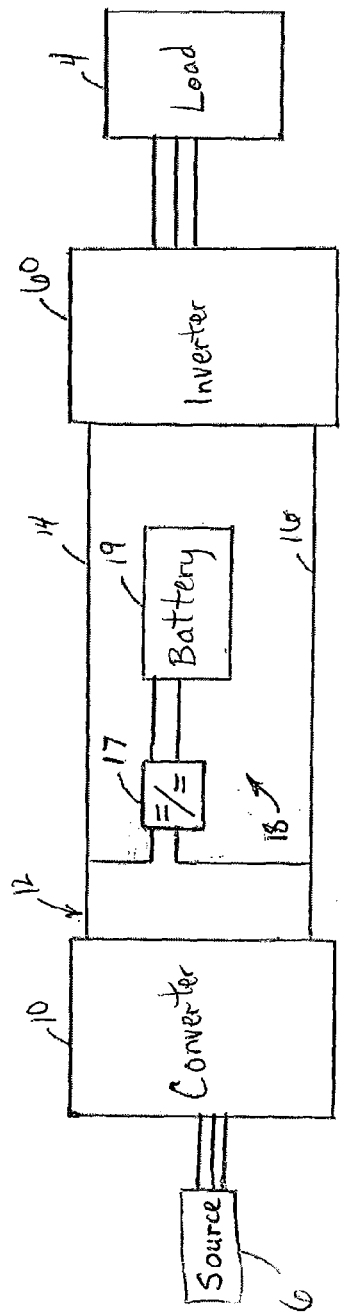
FIG. 2 is a block diagram representation of the power conversion system of FIG. 1 incorporating a DC-to-DC converter and battery as the energy storage device.

Referring also to FIG. 2, the power conversion system may include a DC-to-DC converter 17 and a battery 19 which make up the energy storage device 18. The battery 19 may be one or more batteries connected in series and/or parallel as is understood in the art. Each battery may be, but is not limited to a lead-acid battery, a lithium-ion battery, a zinc-bromide battery, or a flow battery. The DC-to-DC converter 17 is configured to manage bidirectional energy transfer between the DC bus 12 and the battery 19 and is further configured to convert the amplitude of the DC voltage, $V_{DC}$, present on the DC bus 12 to a suitable amplitude required by the battery 19.

Figure 3:
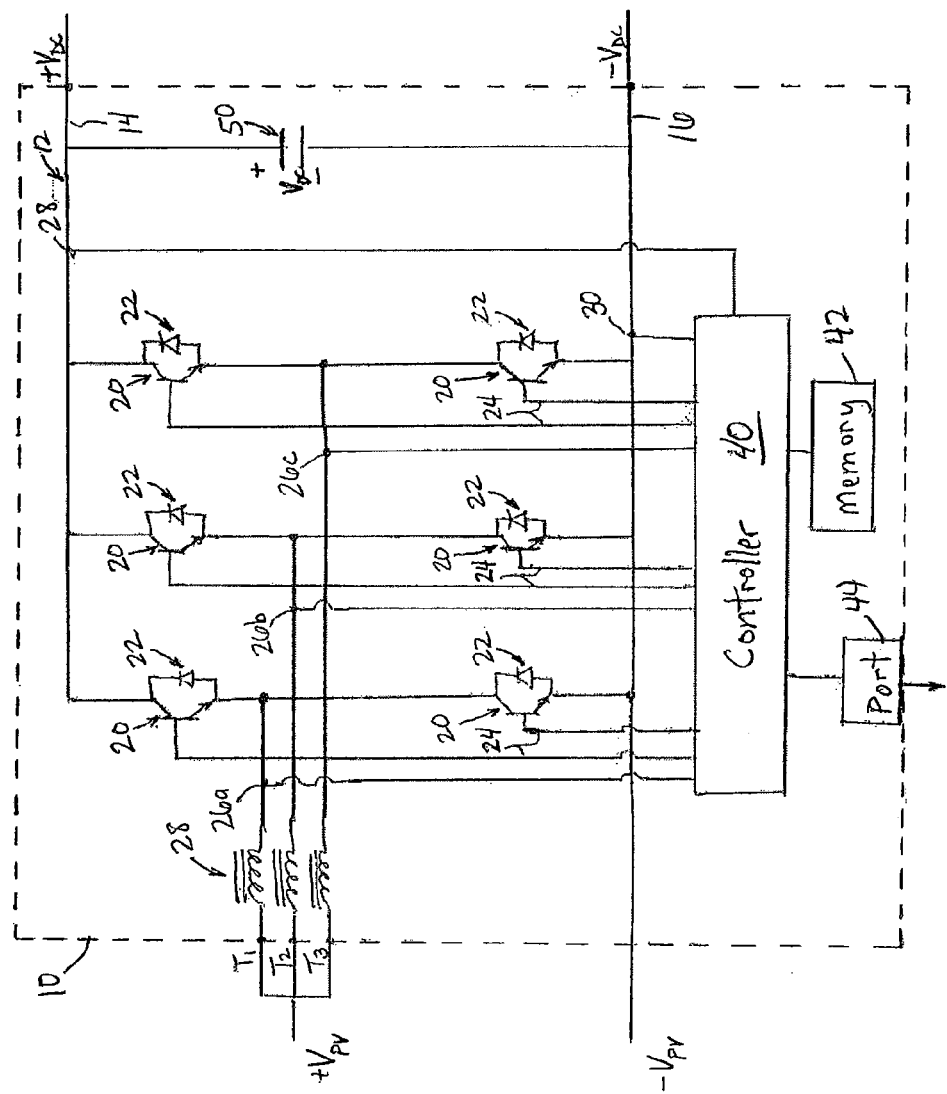
FIG. 3 is a schematic representation of the converter of FIG. 1 connected to a DC source such as a solar array.

Turning next to FIG. 3, an exemplary converter 10 incorporating one embodiment of the present invention is illustrated. The converter 10 includes three input terminals, $T_1$-$T_3$, configured to receive an input voltage from the energy source 6. According to the illustrated embodiment, the energy source 6 is a PV array. Although three inputs are used for this configuration, one or more inputs will also provide a similar result. The input terminals, $T_1$-$T_3$, of the illustrated embodiment are connected together to receive a positive terminal, $+V_{pv}$, from the PV array generating a DC voltage. Optionally, each of the input terminals, $T_1$-$T_3$, may be connected to separate terminals from different PV arrays. The negative terminal, $-V_{pv}$, from the PV array is connected to the negative rail 16 of the DC bus 12. An input filter 28 provides inductance connected in series with each of the terminals, $T_1$-$T_3$.

Figure 4:
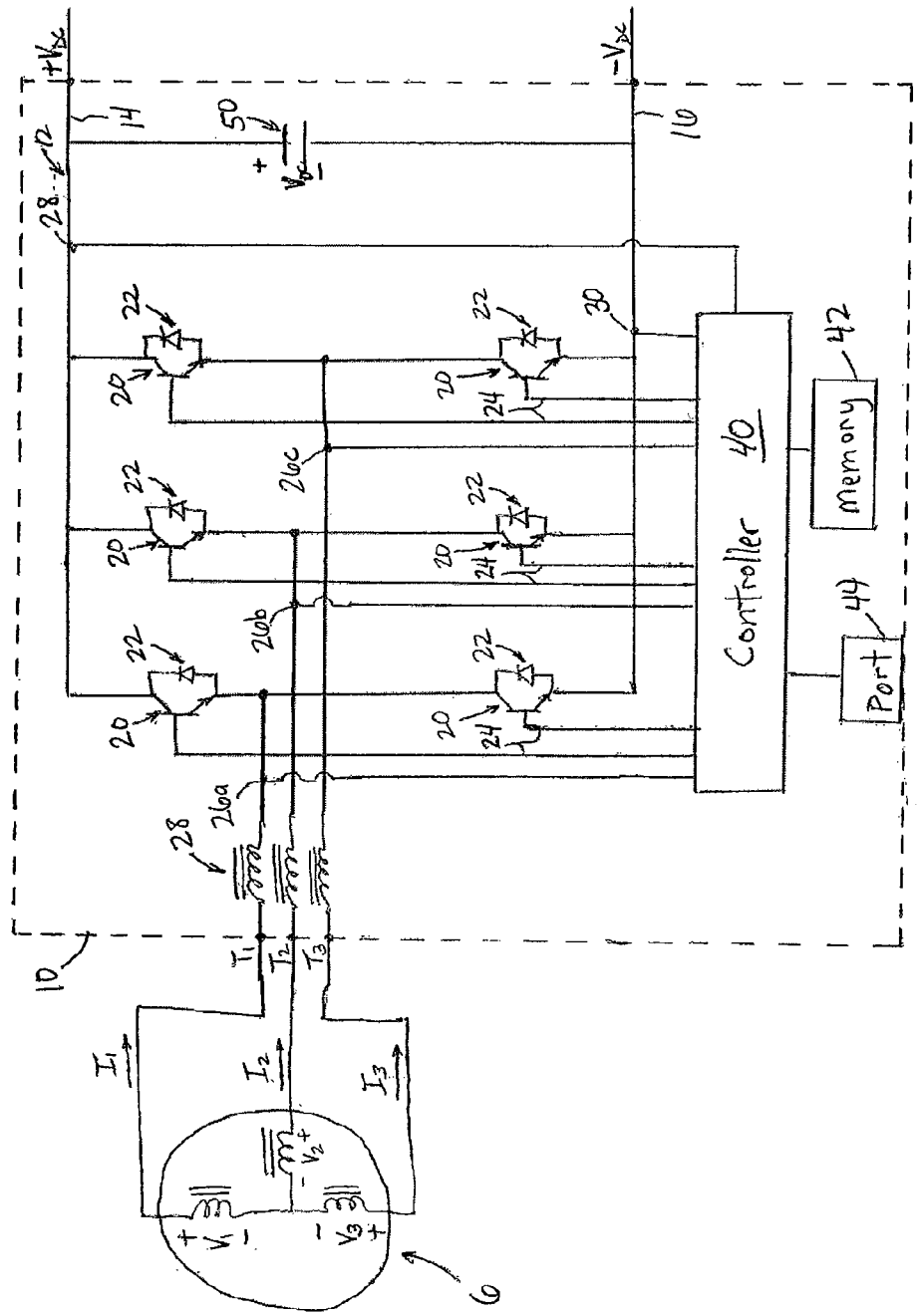
FIG. 4 is a schematic representation of the converter of FIG. 1 connected to an AC source such as a wind turbine.

Referring also to FIG. 4, the input terminals, $T_1$-$T_3$, of the converter 10 may be connected to an AC source. According to the illustrated embodiment, the energy source 6 is a wind turbine. The wind turbine generates a three-phase AC voltage, $V_1$-$V_3$. Each of the phases, $V_1$-$V_3$, is connected to one of the input terminals, $T_1$-$T_3$, of the converter 10. Optionally, the energy source 6 may be other AC generation devices, providing either single or multi-phase voltage to the converter 10.

The converter 10 converts the input voltage from the energy source 6 to the desired DC voltage, $V_{dc}$, present on the DC bus 12 using switching devices 20. The DC bus 12 includes a positive rail 14 and a negative rail 16 which are made available at outputs, $+V_{dc}$ and $-V_{dc}$. The switching devices 20 are typically solid-state power devices. FIGS. 3 and 4 show the switching devices 20 as bipolar junction transistors (BJTs); however, it is contemplated that any suitable switching device according to the application requirements may be used, including, but not limited to, insulated gate bipolar transistors (IGBT), field effect transistors (FETs), silicon controlled rectifiers (SCR), thyristors such as integrated gate-commutated thyristor (IGCT) or gate turn-off thyristors (GTO), or other controlled devices. A diode 22 is connected in parallel to each of the switching devices 20 for reverse conduction across the switching device as required when the switching device 20 is turned off. This diode 22 may also be a part of the semiconductor switch. Each switching device 20 is controlled by a gate signal 24. The gate signal 24 is enabled or disabled to selectively permit conduction through the switching device 20, which, in turn, selectively connects either the positive rail 14 or the negative rail 16 to one of the input terminals, $T_1$-$T_3$. A capacitance 50 is connected between the positive rail 14 and the negative rail 16 of the DC bus 12. The capacitance 50 may be a single capacitor or any number of capacitors connected in series or parallel according to the system requirements. The capacitance 50 is configured to reduce the magnitude of ripple voltage resulting from the voltage conversion between the input voltage and the DC bus 12.

A controller 40 executes a series of stored instructions to generate the gate signals 24. The controller 40 receives feedback signals from sensors corresponding to the amplitude of the voltage and/or current at various points throughout the converter 10. The locations are dependent on the specific control routines being executed within the controller 40. For example, input sensors, 26a-26c, may provide an amplitude of the voltage present at each input terminal, $T_1$-$T_3$. Optionally, an input sensor, 26a-26c, may be operatively connected to provide an amplitude of the current conducted at each input terminal, $T_1$-$T_3$. Similarly a current and/or a voltage sensor, 28 and 30, may be operatively connected to the positive rail 14 and the negative rail 16, respectively, of the DC bus 12. The controller 40 interfaces with a memory device 42 to retrieve the stored instructions and with a communication port 44 to communicate with external devices.

Figure 7:
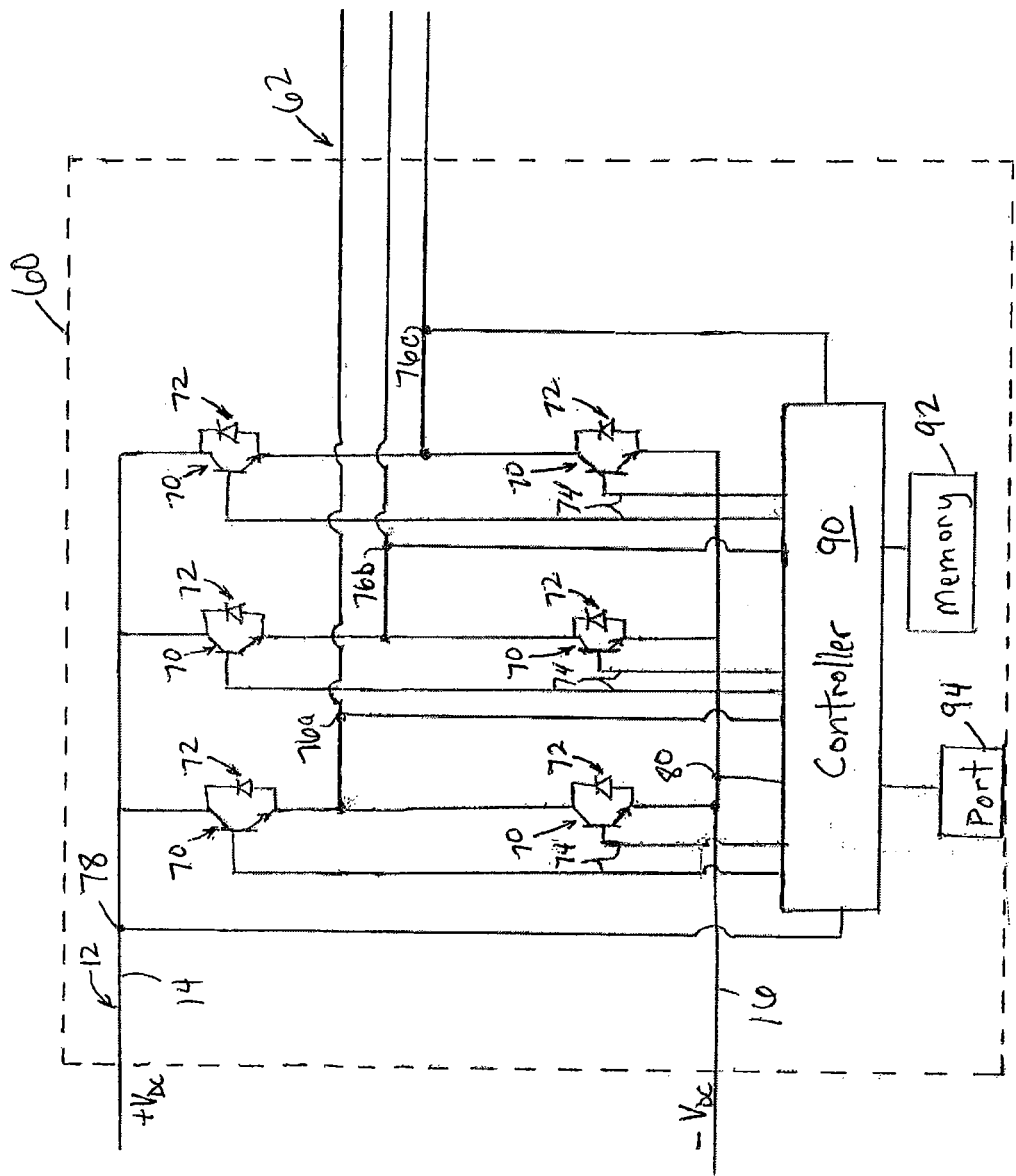
FIG. 7 is a schematic representation of the inverter of the power conversion system of FIG. 1.

Referring next to FIG. 7, the second power converter 60 is arranged as an inverter 60 configured to convert the DC voltage, $V_{dc}$, to an AC voltage at the output 62 of the inverter 60. The conversion is performed using switching devices 70 which selectively connect either the positive rail 14 or the negative rail 16 to one of the phases of the output voltage. The switching devices 70 are typically solid-state power devices. FIG. 7 shows the switching devices 70 as bipolar junction transistors (BJTs); however, it is contemplated that any suitable switching device according to the application requirements may be used, including, but not limited to, insulated gate bipolar transistors (IGBT), field effect transistors (FETs), silicon controlled rectifiers (SCR), thyristors such as integrated gate-commutated thyristor (IGCT) or gate turn-off thyristors (GTO), or other controlled devices. A diode 72 is connected in parallel to each of the switching devices 70 for reverse conduction across the switching device as required when the switching device 70 is turned off. This diode 72 may also be a part of the semiconductor switch. Each switching device 70 is controlled by a gate signal 74. The gate signal 74 is enabled or disabled to selectively permit conduction through the switching device 70.

A controller 90 executes a series of stored instructions to generate the gate signals 74. The controller 90 receives feedback signals from sensors corresponding to the amplitude of the voltage and/or current at various points throughout the inverter 60. The locations are dependent on the specific control routines being executed within the controller 90. For example, output sensors, 76a-76c, may provide an amplitude of the voltage present at each phase of the output 62. Optionally, the output sensor, 76a-76c, may be operatively connected to provide an amplitude of the current present at each phase of the output 62. Similarly a current and/or a voltage sensor, 78 and 80, may be operatively connected to the positive rail 14 and the negative rail 16, respectively, of the DC bus 12. The controller 90 interfaces with a memory device 92 to retrieve the stored instructions and with a communication port 94 to communicate with external devices. According to one embodiment of the invention, the first converter 10 and the second converter 60 are separate modules having separate controllers 40, 90 and memory devices 42, 92 configured to control operation of the respective power converter. Optionally, a single controller and memory device may be configured to control operation of both power converters.

In operation, the power conversion system operates to transfer power generated by the source 6 to the load 4. The first power converter 10 is configured to transfer power from the source 6 to the DC bus 12 and the second power converter 60 is configured to transfer power from the DC bus 12 to the load 4. The controller 40, 90 of each power converter 10, 60 executes one or more control modules which generate switching signals 24, 74 to selectively connect the switches 20, 70 between the DC bus 12 and either the input terminals, $T_1$-$T_3$, or the output 62 according to the desired form of power conversion.

According to one embodiment of the invention, the output 62 of the second power converter 60 is configured to generate an AC output voltage. Consequently, the DC voltage, $V_{DC}$, present on the DC bus 12 must be converted to an AC voltage synchronized to the utility grid. In order to convert a DC voltage to an AC voltage, the controller 90 executes a modulation routine. The modulation routine executes at a periodic interval, also known as the switching period, T. During the switching period, the modulation routine generates a switching signal 74 which enables a switch 70 for a portion of the switching period, also known as the duty cycle, D. Thus, the voltage at the output is equal to the voltage present on the DC bus, $V_{DC}$, for a portion of the period, T, and equal to zero volts for a portion of the period, T. An average value of the voltage over this period is determined as a function of the voltage present on the DC bus, $V_{DC}$, and of the duty cycle, D. The modulation routine controls the duty cycle, D, such that the average value of the voltage varies in a sinusoidal manner, resulting in an approximated AC voltage, in which the fundamental harmonic component is the desired AC output voltage. The remaining harmonic components may generate some ripple on the output voltage and/or current resulting in energy losses in the power converter. As the switching period decreases (i.e. the switching frequency increases), the approximated AC voltage more closely resembles an actual sinusoidal voltage waveform, thereby reducing harmonic losses/distortion in the output voltage.

According to one aspect of the invention, it may be desirable to transfer power from the alternate power source 6 to the utility grid. The output 62 of the second power converter 60 is, therefore, connected to the utility grid. According to industrial standards, a power converter 60 connected to a utility grid must maintain a low total harmonic distortion. Consequently, the switching frequency of the second power converter 60 must remain high enough to meet the standards. However, increasing the switching frequency increases the rate at which switches 70 are turned on and off, thereby increasing switching losses in the converter 60. Each switch 70 has a characteristic power loss, or inefficiency, when transitioning between the on and off states, also known as switching losses. As the switching frequency increases, the switching losses associated with the switches 70 similarly increase. The power converter 60 is configured to discontinue operation when the power to be transferred drops below a certain level. For example, an exemplary converter 60 capable of transferring up to 100 kilowatts of power from the DC bus 12 to the grid may operate at 96% efficiency from about one quarter power (i.e. 25 kilowatts) to full power (i.e. 100 kilowatts). However, when the converter 60 is required to transfer about 10 kilowatts, or 10% of the capacity of the converter 60, the operating efficiency drops to about 90%. Thus, the operating range of the converter 60 is between about 10% and 100% of the rated capacity of the converter 60. The threshold to discontinue operation of the converter 60 is, therefore, set to 10% of rated capacity, which corresponds to the operating point at which the switching losses are equal to, or almost equal to, the level of power being transferred.

Rather than being configured to keep harmonic distortion below a desired level, the first power converter 10 is configured to transfer the maximum amount of energy generated by the alternate power source 6 to the DC bus 12. Although the switches 20 of the first power converter 10 also have switching losses, the first power converter 10 may not need to operate at as high of switching frequency as the second power converter 60 thereby reducing the switching losses associated with the first power converter 10. It is further contemplated that the first power converter 10 may be configured to operate in multiple modes. For example, during periods of high power transfer, it may be more efficient to operate at a higher switching frequency, and during periods of low power transfer, it may be more efficient to operate at a lower switching frequency. The first power converter 10 may, therefore, be configured to vary the switching frequency at which it operates as a function of the level of power transfer. It is contemplated that the first power converter 10 may operate in still other modes to increase the percentage of power generated by the alternate energy source 6 that is transferred to the DC bus 12. An exemplary first power converter 10 may, for example, be similarly rated to the exemplary second power converter 60 to transfer up to 100 kilowatts of power from the source 6 to the DC bus 12. However, due to the different operating modes, the first power converter 10 may be configured to have an operating range between about 1% and 100% of the rated capacity of the first power converter 10. Thus, the first power converter 10 may transfer energy generated from the source 6 to the DC bus 12 during periods of low power generation in which the second power converter 60 cannot efficiently operate.

Figure 5:
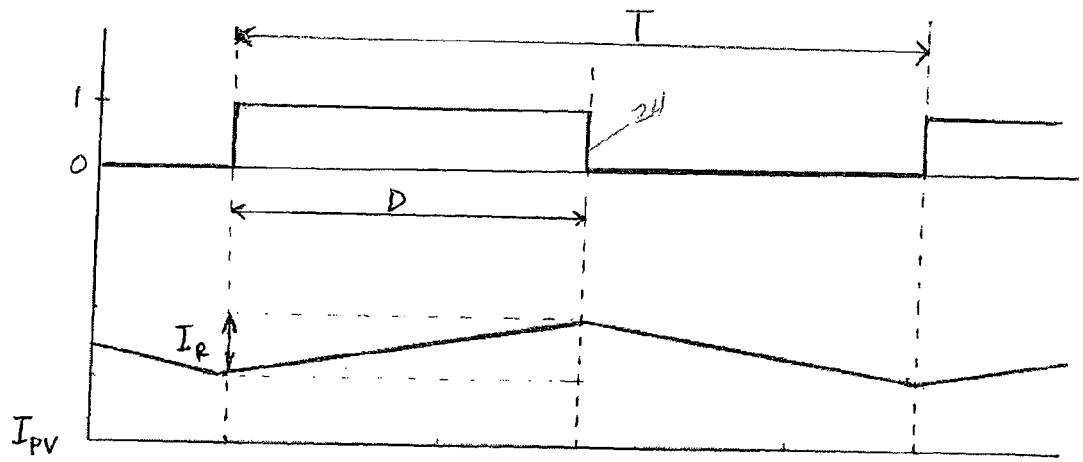
FIG. 5 is a graphic representation of the current during one modulation period of the converter of FIG. 1.

Referring next to FIG. 5, the current drawn from the PV array, $I_{pv}$, is illustrated over one period, T, of pulse width modulation for the first power converter 10 as a function of one of the switching signals 24 controlling a corresponding switching device 20. The switching signal 24 is on for a percentage of the total period, T, and off for the remainder of the period, T, where the percentage of the period, T, the switching signal 24 is on may be referred to as the duty cycle, D, or as the on time, $t_{on}$. As the switching signal 24 turns on and off, the corresponding switch 20 alternately conducts and blocks current. The controller 40 varies the duty cycle, D, as a function of the energy generated by the alternate energy source 6. For example, as the amount of energy generated by the alternate energy source 6 decreases, the duty cycle, D, may be decreased because less on time is required to transfer the energy to the DC bus 12. The on time, $t_{on}$, may continue to be reduced until it reaches a minimum value at which the switching losses of the switch 20 exceed the power that is transferred by turning the switch 20 on.

Figure 6:
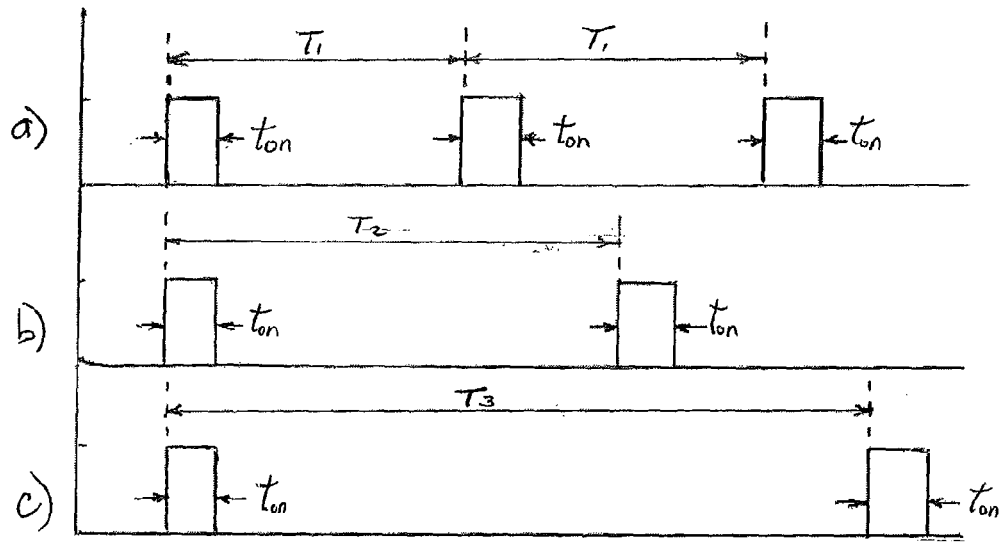
FIG. 6 is a graphic representation of a variable modulation period.

Referring next to FIG. 6, it is contemplated that the first power converter 10 may further include an operating mode configured to maximize power transfer during periods of low energy generation. In order to continue operating the first power converter 10 to transfer power when the alternate energy source 6 is generating energy at a level below that which results in the switch 20 conducting for a minimum on time, $t_{on}$, the converter 10 begins varying the period, T, of the pulse width modulation. For example, FIG. 6a may represent the point at which the converter 10 has reached its minimum duty cycle, D. The period, $T_1$ is equal to the normal operating period which may be, for example, 100 μsec which corresponds to a 10 kHz switching frequency. As the energy generated by the alternate energy source 6 decreases further, the modulation period may be extended, for example, to $T_2$ and subsequently to $T_3$. It is contemplated that the modulation period may be extended to at least 20 msec, which corresponds to a 50 Hz switching frequency. Thus, as the energy generated decreases, the converter 10 may continue operation across a broader operating range to increase the amount of energy transferred to the DC bus 12. It is contemplated that still other methods of operation during low power generation may be utilized without deviating from the scope of the invention.

However, while the operating range of the first power converter 10 may be extended, the operating range of the second power converter 60 cannot be extended in order to meet the required limits on total harmonic distortion. Consequently, the energy storage device 18 is used to store the energy transferred to the DC bus 12 while the first power converter 10 is operating and the second power converter 60 is disabled.

The level of energy stored in the energy storage device 18 is measured, for example, by a voltage sensor generating a signal corresponding to the voltage level present on the energy storage device 18. When the energy stored in the storage device 18 reaches a suitable level, the second power converter 60 is enabled to transfer the stored energy to the load 4. If the energy source 6 continues to generate energy at a rate less than the rate at which the second power converter 60 transfers energy to the load 4, the energy stored in the energy storage device 18 is transferred back onto the DC bus 12 such that a sufficient level of energy is present on the DC bus 12 for the second power converter 60 to operate. The second power converter 60 may continue operating until the energy storage device 18 is depleted and no longer able to supplement the energy generated by the source 6. At this point, the rate of energy transfer from the DC bus 12 to the load 4 decreases until the second power converter 60 reaches the minimum level at which it is configured to operate and finally is disabled.

Consequently, during periods of low power generation by the energy source 6, the second power converter 60 may be disabled and the storage device 18 operates to draw the power from the DC bus 12 into the storage device 18. When the storage device 18 has stored a sufficient level of energy such that the second power converter 60 may operate at a desired level of efficiency, the second power converter 60 is enabled. Thus, during periods of low power generation by the energy source 6, the power conversion system continuously captures power generated by the energy source 6 and delivers it in bursts to the electrical load 4.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A power conversion system, comprising:
a first power converter having an input and an output, wherein the first power converter is configured to receive electrical energy in a first form at the input and provide a DC voltage at a predefined magnitude at the output;
a second power converter having an input and an output, wherein the second power converter is configured to receive the DC voltage at the predefined magnitude at the input and provide an AC voltage at the output;
a DC bus connected between the output of the first power converter and the input of the second power converter, the DC bus configured to conduct the DC voltage at the predefined magnitude; and
an energy storage device operatively connected to the DC bus, wherein:
the second power converter has a first threshold below which it stops converting the DC voltage to the AC voltage and a second threshold above which it starts converting the DC voltage to the AC voltage;
the first power converter is configured to convert the electrical energy at the input to the DC voltage below the first threshold of the second power converter; and
the energy storage device is configured to store electrical energy when the first power converter is operating and the second power converter is not operating.

2. The power conversion system of claim 1 further comprising a DC-to-DC converter operatively connected between the DC bus and the energy storage device.

3. The power conversion system of claim 2 wherein the energy storage device is an ultra-capacitor.

4. The power conversion system of claim 2 wherein the energy storage device is a battery.

5. The power conversion system of claim 2 further comprising a sensor generating a feedback signal corresponding to a state of charge present on the energy storage device, wherein:
the second power converter receives the feedback signal and compares the feedback signal to the second threshold to control operation of the second power converter.

6. The power conversion system of claim 1 wherein the first power converter includes:
a plurality of switches selectively connecting the input to the output according to a plurality of control signals, each control signal corresponding to one of the plurality of switches, and
a controller generating the control signals to convert the electrical energy at the input to the DC voltage in a first mode and in a second mode, and wherein
each switch has a switching loss associated with selectively connecting the input to the output,
the controller operates in the first mode above a third threshold, wherein the third threshold is equal to or greater than the switching losses generated by the switches in the first mode, and
the controller operates in the second mode below the third threshold.

7. A method of controlling power transfer from a renewable energy source to an electrical load using a first power converter and a second power converter, wherein the first and second power converters are connected via a DC bus and wherein the renewable energy source has a variable power generation capability, the method comprising the steps of:
executing a control module on the first power converter to transfer energy generated by the renewable energy source to the DC bus;
storing at least a portion of the energy from the DC bus in an energy storage device;
measuring the energy stored in the energy storage device;
executing a control module on the second power converter to transfer energy from the DC bus to one of an electrical load and an energy grid; and
measuring the rate of energy transfer from the DC bus, wherein:
the step of executing the control module on the second power converter to transfer energy from the DC bus to one of the electrical load and the energy grid is disabled when the rate of energy transfer from the DC bus drops below a first threshold, and
the step of executing the control module on the second power converter to transfer energy from the DC bus to one of the electrical load and the energy grid is enabled when the energy stored in the energy storage device exceeds a second threshold.

8. The method of claim 7 wherein the step of storing at least a portion of the energy from the DC bus in the energy storage device further comprises the steps of:
measuring an amplitude of voltage present on the DC bus;
executing a control module on a third power converter connected between the DC bus and the energy storage device to transfer energy between the DC bus and the energy storage device as a function of the amplitude of voltage present on the DC bus.

9. The method of claim 8 wherein the energy storage device is an ultra-capacitor.

10. The method of claim 8 wherein the energy storage device is a battery.

11. The method of claim 7 wherein the step of executing the control module on the first power converter to transfer energy generated by the renewable energy source to the DC bus is disabled when the rate of energy transfer from the renewable energy source to the DC bus drops below a third threshold and wherein the third threshold is less than the first threshold.

12. A power conversion system, comprising:
a first power converter having an input and an output, wherein the first power converter is configured to receive electrical energy in a first form at the input and provide a DC voltage at a predefined magnitude at the output;
a second power converter having an input and an output, wherein the second power converter is configured to receive the DC voltage at the predefined magnitude at the input and provide an AC voltage at the output;
a DC bus connected between the output of the first power converter and the input of the second power converter, the DC bus configured to conduct the DC voltage at the predefined magnitude;
a third power converter having an input and an output, wherein the input is connected to the DC bus and the third power converter is configured to convert the DC voltage at the input to a second DC voltage at the output and is further configured for bidirectional power transfer between the input and the output;
an energy storage device operatively connected to the output of the third power converter; and
a sensor generating a signal corresponding to a magnitude of energy present in the energy storage device, wherein:
the second power converter stops converting the DC voltage to the AC voltage when the rate of power transfer in the second power converter drops below a first threshold and the second power converter starts converting the DC voltage to the AC voltage when the signal corresponding to the magnitude of energy present in the energy storage device is equal to or greater than a second threshold;
the first power converter stops converting the electrical energy from the input to the DC voltage when the rate of power transfer in the first power converter drops below a third threshold and wherein the third threshold is less than the first threshold; and
the energy storage device is configured to store electrical energy when the first power converter is operating and the second power converter is not operating.

* * * * *